United States Patent [19]

Dewa

[11] Patent Number: 5,278,958
[45] Date of Patent: Jan. 11, 1994

[54] METHOD AND APPARATUS FOR SELECTING A KEYBOARD ON A COMPUTER SYSTEM

[75] Inventor: Koichi Dewa, Oome, Japan

[73] Assignee: Kabushiki Kaisha Toshiba, Kawasaki, Japan

[21] Appl. No.: 662,999

[22] Filed: Feb. 28, 1991

Related U.S. Application Data

[63] Continuation-in-part of Ser. No. 300,984, Jan. 24, 1989, abandoned.

[30] Foreign Application Priority Data

Jan. 27, 1988 [JP] Japan ................ 63-14638

[51] Int. Cl.⁵ .................................. G06F 3/04
[52] U.S. Cl. .................... 395/275; 364/234; 364/234.1; 364/709.12; 364/239.4
[58] Field of Search ............ 364/200, 900, DIG. 1, DIG. 2, 709.01, 709.12; 341/22; 340/711

[56] References Cited

U.S. PATENT DOCUMENTS

| | | | |
|---|---|---|---|
| 3,973,256 | 8/1976 | Stroesser et al. | 340/365 E |
| 4,064,560 | 12/1977 | Baxter | 364/900 |
| 4,237,535 | 12/1980 | Wiedenman | 364/200 |
| 4,360,870 | 11/1982 | McVey | 364/200 |
| 4,458,357 | 7/1984 | Weymouth et al. | 364/200 |
| 4,485,437 | 11/1984 | Kinghorn | 364/200 |
| 4,492,582 | 1/1985 | Chang et al. | 434/169 |
| 4,575,714 | 3/1986 | Rummel | 340/568 |
| 4,638,422 | 1/1987 | Rees | 364/200 |
| 4,642,761 | 2/1987 | Yanagiuchi et al. | 364/200 |

FOREIGN PATENT DOCUMENTS

| | | | |
|---|---|---|---|
| 62-274326 | 11/1987 | Japan | G06F 3/02 |
| 64-59524 | 7/1989 | Japan | G06F 3/02 |
| 2174261A | 10/1986 | United Kingdom | |

OTHER PUBLICATIONS

"Technical Reference," IBM Personal Computer Hardware Reference Library, Mar. 1984.

Primary Examiner—Roy N. Envall, Jr
Assistant Examiner—A. Bodendorf
Attorney, Agent, or Firm—Finnegan, Henderson, Farabow, Garrett & Dunner

[57] ABSTRACT

The selection of a keyboard on a computer system can automatically be achieved. If any externally provided keyboard which transmits transmission data upon the turning on of a computer system is connected to an external keyboard controller, a selection circuit selects that external keyboard controller for controlling the externally provided keyboard. If, on the other hand, no externally provided keyboard is connected to the external keyboard controller, the selection circuit selects an incorporated keyboard controller for controlling an incorporated keyboard which is incorporated in the computer system. When the externally provided keyboard is connected to the external keyboard controller, the selection of a keyboard by the selection circuit is achieved depending upon whether or not the computer system receives transmission data from the externally provided keyboard.

5 Claims, 6 Drawing Sheets

STATUS REGISTER DEFENITION TABLE

| BIT | STATUS | | CONTENTS |
|---|---|---|---|
| 0 | OUTPUT BUFFER FULL | 0 | OUTPUT BUFFER IS EMPTY |
| | | 1 | DATA IS PLACED INTO OUTPUT BUFFER BUT THE SYSTEM HAS NOT YET READ THE DATA. WHEN THE SYSTEM READS THE DATA OF OUTPUT BUFFER, THIS BIT WILL RETURN TO 0. |
| 1 | INPUT BUFFER FULL | 0 | INPUT BUFFER IS EMPTY |
| | | 1 | DATA HAS BEEN WRITTEN INTO INPUT BUFFER BUT THE CONTROLLER HAS NOT READ THE DATA. WHEN THE CONTROLLER READS THE DATA, THIS BIT WILL RETURN TO 0. |
| 2 | SYSTEM FLAG | 0 | AFTER A POWER ON RESET |
| 3 | COMMAND/ DATA | 0 | WRITE INTO DATA BOARD (060H) |
| | | 1 | WRITE INTO COMMAND BOARD (064H) |
| 4 | INHIBIT SWITCH | 0 | THE KEYBOARD IS INHIBITED |
| | | 1 | THE KEYBOARD IS NOT INHIBITED |
| 5 | TRANSMIT TIME-OUT | 0 | NORMAL TRANSMISSION WAS COMPLETED |
| | | 1 | TRANSMISSION TO THE KEYBOARD WAS NOT PROPERLY COMPLETED |
| 6 | RECEIVE TIME-OUT | 0 | NORMALLY RECEPTION |
| | | 1 | RECEPTION TO THE KEYBOARD WAS NOT PROPERLY COMPLETED |
| 7 | PARITY ERROR | 0 | RECEPTION BY ODD PARITY (NORMAL) |
| | | 1 | RECEPTION BY EVEN PARITY (ERROR) |

FIG. 6

METHOD AND APPARATUS FOR SELECTING A
KEYBOARD ON A COMPUTER SYSTEM

This application is a continuation-in-part of application Ser. No. 07/300,984, filed Jan. 24, 1989, now abandoned.

BACKGROUND OF THE INVENTION

1. Field of the Invention

The present invention relates to a method for selecting one keyboard in a lap-top type computer and apparatus for implementing the same.

2. Description of the Related Art

In place of the conventional desk-top computer, a lap-top type computer has increasingly been employed which is compact, lightweight and convenient to carry with the user. The lap-top type computer includes, for example, a keyboard, display and floppy disk drive.

The keyboard incorporated into the lap-top type computer is made compact, but is different from a full keyboard of the aforementioned desk-top type computer in terms of the layout of keys, total number of keys and touching of the keys. Thus the keyboard of the lap-top type computer is very not user-friendly in the operation of keys.

The lap-top type computer may be used by connecting it to an externally provided full keyboard. In this case, some device will be necessary to select one of the externally provided full keyboard and that keyboard incorporated into the computer.

Thus a demand is grown for an automatic keyboard selection device.

SUMMARY OF THE INVENTION

It is accordingly the object of the present invention to provide a method and apparatus which select a keyboard on a computer system or can be selectively connected to an externally provided full keyboard.

According to one aspect of the present invention, there is provided a method for selecting a keyboard utilized for a computer system, the method comprising the steps of: determining whether or not transmission data from an externally provided keyboard is received, thereby generating a selection signal; and selecting one of a keyboard incorporated in the computer system and the externally provided keyboard in accordance with the generated selection signal.

According to another aspect of the present invention, there is to provided a computer system comprising: processing means for processing data; a first keyboard; first keyboard control means for controlling the first keyboard; a second keyboard including means for transmitting transmission data to the processing means when the computer system is powered on; second keyboard control means for controlling the second keyboard; determining means for determining whether or not the transmission data from the second keyboard is received, thereby generating a selection signal; and selecting means for selecting one of the first keyboard control means and the second keyboard control means in accordance with the selection signal generated by the determining means, thereby connecting one of the first keyboard control means and the second keyboard control means with the processing means.

BRIEF DESCRIPTION OF THE DRAWINGS

FIG. 6 is a table illustrating the status register bit definitions.

DETAILED DESCRIPTION OF THE PREFERRED EMBODIMENT

The embodiment of the present invention will be explained below with reference to the accompanying drawings.

An apparatus of the present invention has the function of transmitting one or more transmission data when a computer is turned on and can widely be used for an external separate keyboard.

Figure 1:
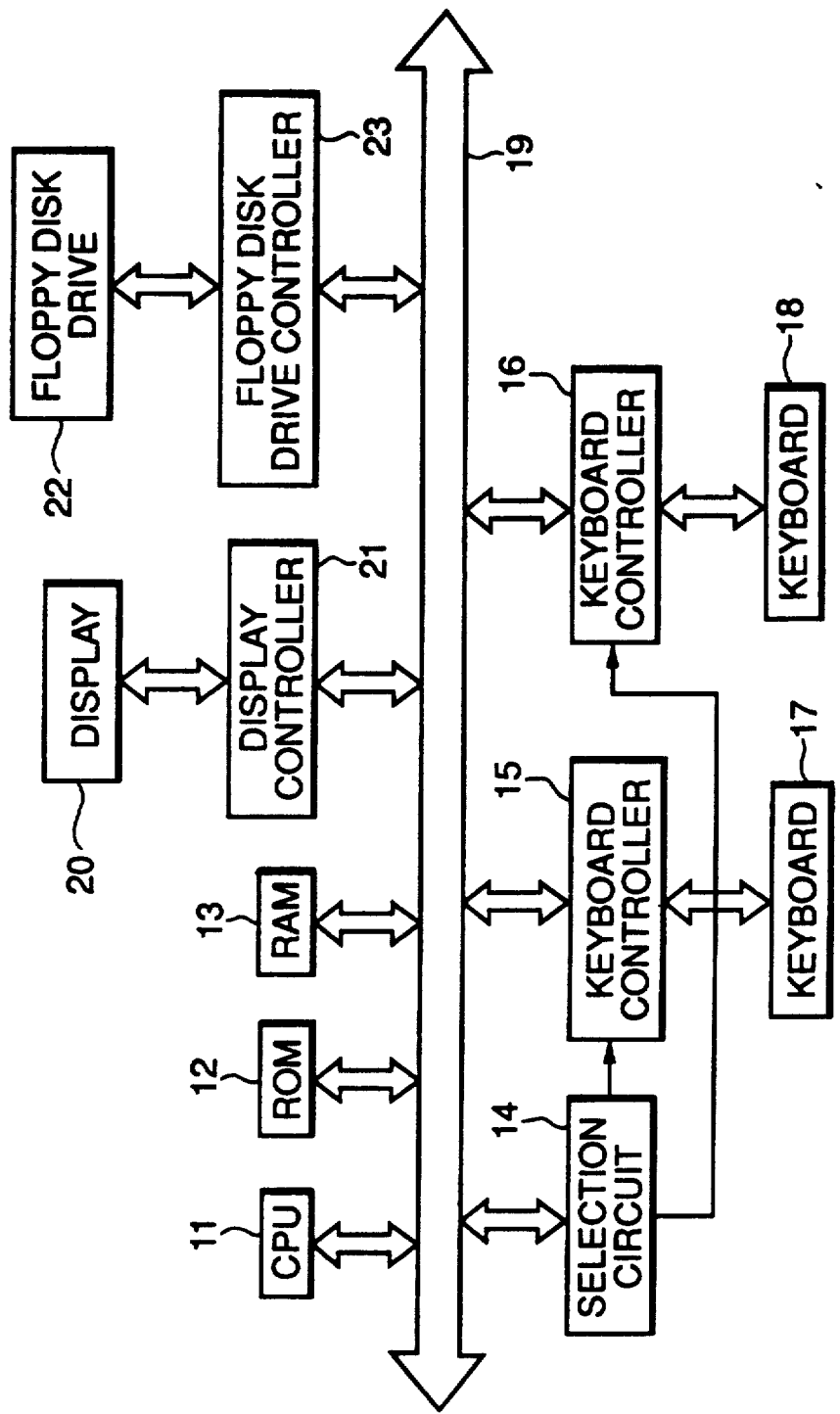
FIG. 1 is a schematic view showing an arrangement of a computer system having a keyboard selection apparatus according to an embodiment of the present invention.

A computer system of FIG. 1 includes CPU (Central Processing Unit) 11, ROM (Read Only Memory) 12, RAM (Random Access Memory) 13, selection circuit 14, keyboard controller 15, keyboard controller 16, display controller 21 and floppy disk drive controller 23, system bus 19 connected to above elements. The computer system further includes keyboard 17 controlled by keyboard controller 15, keyboard 18 controlled by keyboard controller 16, display 20 controlled by display controller 21 and floppy disk drive 22 controlled by floppy disk drive controller 23. Keyboard 17 is incorporated in the computer system and keyboard 18 is externally connected to the computer system. Selection circuit 14 is connected to keyboard controller 15 and to keyboard controller 16.

The CPU 11 is constituted by, for example, a 16-bit CPU 80286 from Intel Corporation. The ROM 12 and RAM 13 are constituted by commonly used LSIs.

The ROM 12 stores computer system control programs such as basic input and output system (BIOS) programs. When a computer system is powered on, a reset signal is transferred from a reset circuit (not shown) to the CPU 11. After receiving the reset signal, the CPU 11 designates a head address of the ROM 12 to a program counter. After an address jump, an initial reliability test (IRT) program corresponding to one of the BIOS programs stored in the ROM 12 is copied into the RAM 13, because the CPU 11 can execute a program only from the RAM 12. The IRT program is used to test or reset components of each hardware device. For example, a clear of each register of the CPU 11 and an initialization of a keyboard controller are performed.

Figure 3:
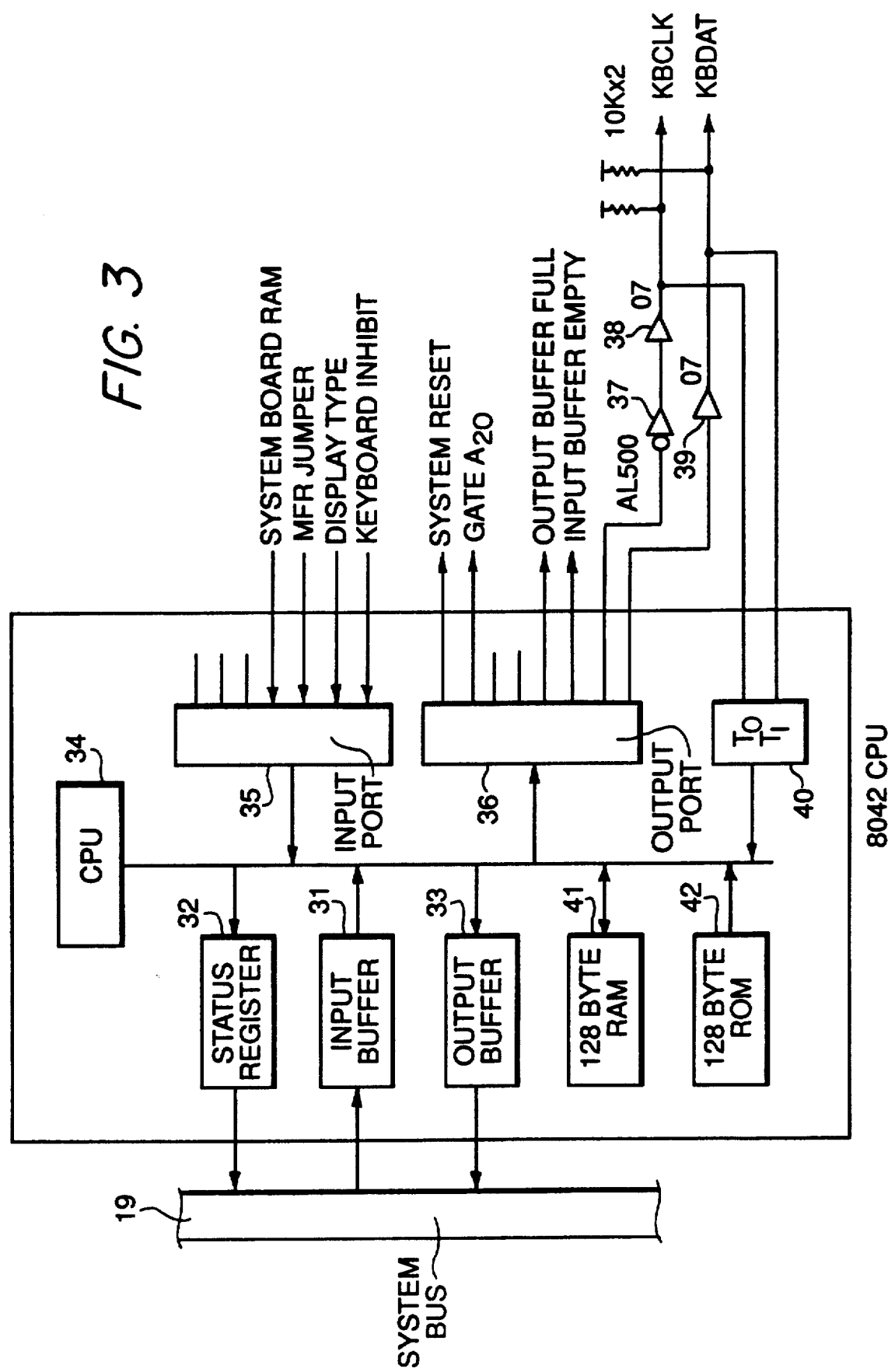
FIG. 3 is a block diagram of the CPU 8042 of the keyboard controller.

The keyboard controllers 15 and 16 are each constituted by, for example, an 8-bit CPU 8042 from Intel Corporation. The keyboard controllers 15 and 16 are connected to the CPU 11 through the system bus 19 using a synchronous half-duplex communication with a "handshake" by a keyboard for a command input. Accordingly, a keyboard cable includes a direct current source line, a ground line, a serial data line KBDAT, and a clock line KBCLK. In communication, a 10 k Hz data clock is supplied from the keyboard to the keyboard controller. The CPU 8042 of the keyboard controller has parallel input and output (I/O) ports and executes I/O control to components of the computer system connected to the I/O ports. FIG. 3 shows a block diagram of the CPU 8042.

In FIG. 3, the connections of either of keyboard controllers 15 or 16 to bus system 19 are connections to input buffer 31 of CPU 8842, and from status register 32 to the bus system and from the output buffer 33 to the bus system. Beyond these components, continuity of the respective signal flow paths is provided to or from internal CPU 34. Input port 35 illustratively receives signals from the system board room, mainframe jumper, display status and keyboard inhibit, among others. Output port 36 illustratively is connected to send signals to system reset, gate A20, and buffer status signals, among others, to bus system 19, and thence to connected components.

Further outputs from output port 36 are transmitted to gates and/or amplifiers 37, 38 and 39, to provide the signals KBCLK and KBDAT which are also coupled back through second input buffer 40 to bus system 19.

The general arrangement and function of CPU 8042 is substantially similar to that known in the art. The purpose of the showing of FIG. 3 is to show the specific utilization of those functions in the context of the present invention.

Figure 2:
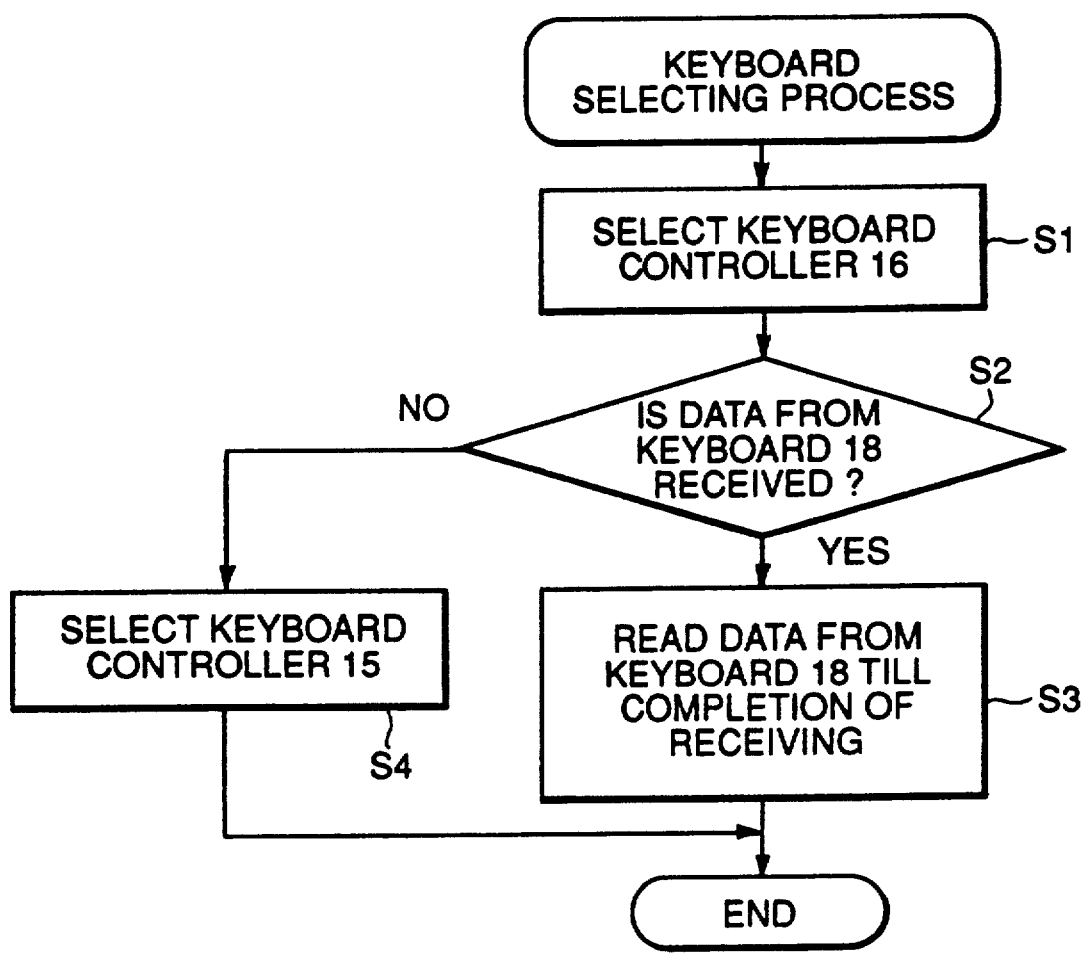
FIG. 2 is a flowchart for selecting one of keyboards.

ROM 12 and RAM 13 store a keyboard selection program as shown in a flowchart of FIG. 2 and selection circuit 14 selects one of the keyboards in accordance with the keyboard selection program.

The keyboard selection processing of the present system will be explained below with reference to FIG. 2.

The keyboard selection program stored in ROM 12 or RAM 13 is executed by CPU 11, after the present system is powered on.

At step S1, selection circuit 14 selects keyboard controller 16 for controlling externally provided keyboard 18, by a command from CPU 11. It is thus possible to connect keyboard 18 to keyboard controller 16. CPU 11 supervises whether or not data is transmitted from keyboard 18. Upon receiving the data from keyboard 18 at step S2, CPU 11 determines that keyboard 18 is connected to keyboard controller 16. At step S3, all the data transmitted from keyboard 18 are received by CPU 11 via keyboard controller 16, thus completing the keyboard selection processing.

At step S2, when no data is transmitted from keyboard 18, selection circuit 14 selects keyboard controller 15 by a command from CPU 11. By the aforementioned processing, it is possible to automatically select one of the externally provided keyboard and keyboard incorporated into the computer system.

When any externally provided keyboard which transmits one or more data upon the turning on of the computer system is connected to the keyboard controller, CPU 11 allows selection circuit 14 to select the externally provided keyboard. If any externally provided keyboard is not connected to the keyboard controller, then the present system can select the keyboard controller incorporated in the computer system.

Figure 4:
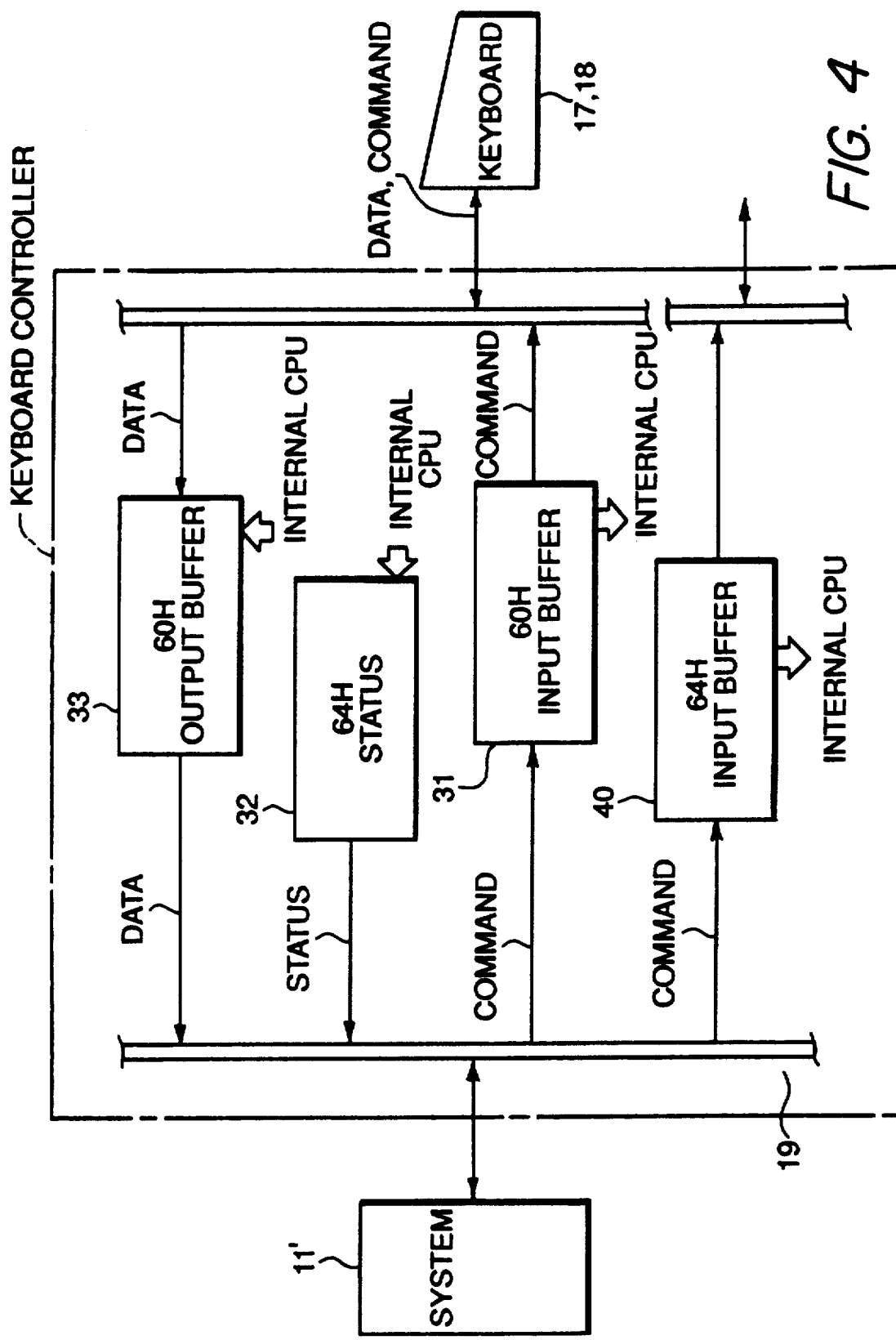
FIG. 4 is a block diagram of a keyboard controller.
Figure 5A:
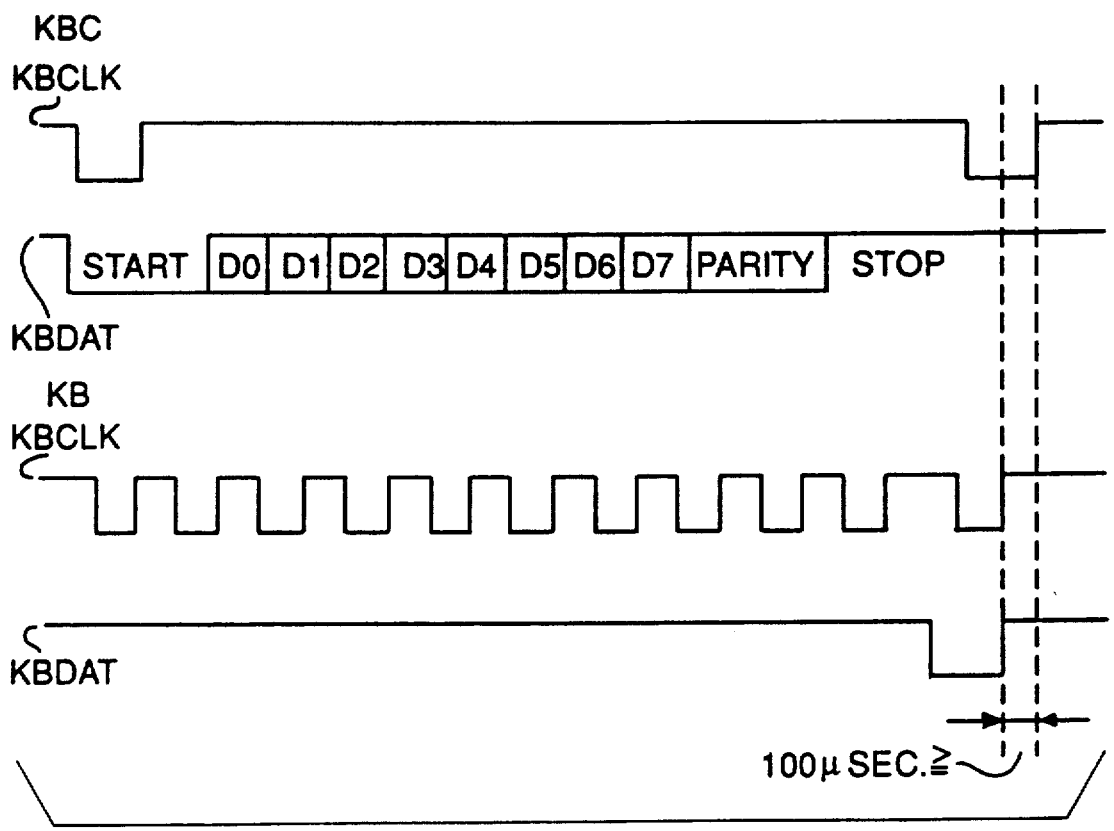
FIGS. 5(a) and 5(b) are timing diagrams illustrating the operation of the keyboard controllers with respect to the KBCLK and KBDAT lines.
Figure 5B:
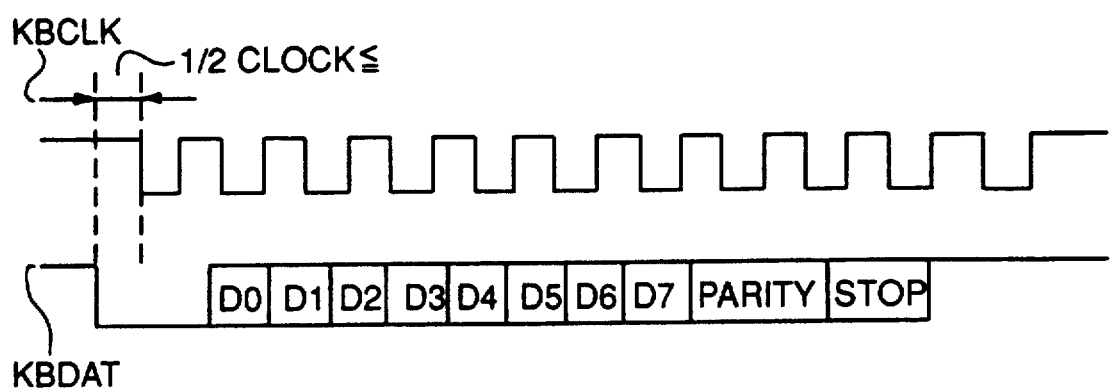

The concept of data and command flow with respect to an I/O address of a keyboard controller will be explained below with FIG. 4, which can be understood as a generalized or alternative showing as compared to that of FIG. 3. A system corresponding to CPU 11 executes data communication to a keyboard through input and output buffers 31 and 33, respectively, in accordance with the contents of a status register 32 of the keyboard controller 15 or 16. Control of the I/O ports of the keyboard controller and various diagnostic programs are performed in accordance with commands from the system. Therefore, the keyboard controller has functions for not only executing as a shift register or a communication port but also for (a) transmitting signals from the system to the keyboard, (b) receiving data commands from the keyboard to the system, (c) error-checking the transmitted and received data, (d) converting a key scan code from the keyboard into a system code (ASCII code), (e) executing commands from the system, and (f) executing a handshake to the keyboard in data transmission and reception. These functions are stored as firmware in the ROM 12 of the keyboard controller.

The selection circuit 14 is used as an I/O port. An I/O register of the selection circuit 14 is reset in execution of the IRT program of the BIOS. After the I/O register is reset, the selection circuit 14 sends an enable signal to the keyboard controller 16 in accordance with a default value, and sends a disable signal to the keyboard controller 15. These signals are produced by controlling a bit 0 of a desired register of the selection circuit 14. In initialization of a system, that is, in execution of the IRT program, a program is set to write "1" into the bit 0 of the desired register. The keyboard controllers 15 and 16 execute instructions from the CPU 11 in accordance with a signal output from the selection circuit 14. That is, when "1" is written into the bit 0, the enable signal (selection signal) is output from the selection circuit 14 to the keyboard controller 16. Since the keyboard controller 15 receives the disable signal from the selection circuit 14, the keyboard controller 15 cannot execute operations by commands from the CPU 11.

The BIOS program stored in the ROM 12 starts by step S1. The CPU 11 controls components of each hardware device on a basis of the BIOS program. During execution of the BIOS program, the CPU 11 executes an initialization process to the selection circuit 14. In the initialization process, a "1" is set into the bit 0 of the desired register of the selection circuit 14, and a selection signal is then sent to a chip selection terminal of the keyboard controller 16. The keyboard controller 16 sequentially processes commands from the CPU 11 in accordance with the selection signal output to the chip selection terminal of the keyboard controller 16. In step S2, the CPU 11 transmits a reset command "FFh" to the keyboard controller 16. The keyboard controller 16 receives the reset command and transmits the received reset command to the externally provided keyboard 18. If the externally provided keyboard 18 is coupled to the computer system, the keyboard 18 sends an acknowledge (ACK) code "FAh" to the CPU 11 through the keyboard controller 16, in response to the reset signal. The keyboard controller 16 determines whether or not the ACK code is sent from the keyboard 18 during a desired period. If the ACK code is not sent during the desired period, the keyboard controller 16 signals the CPU 11 that the keyboard 18 is not coupled to the computer system.

In step S3, if the externally provided keyboard 18 is coupled to the computer system, the keyboard 18 executes the reset command process of step S2. For example, all LEDs blink one time to represent an off state, and the keyboard interruption to the CPU 11 is inhibited. If the initialization process by the keyboard 18 is completed, the keyboard 18 transmits an end code "AAh" to the keyboard controller 16. The end code "AAh" is stored in an output buffer of the keyboard controller 16 to execute an interruption to the CPU 11. The CPU 11 reads the contents of the output buffer of the keyboard controller 16.

In step S4, if the keyboard controller 16 does not receive the ACK code, the keyboard controller 16 determines that the externally provided keyboard 18 is not coupled to the computer system and outputs an error code to the CPU 11. The CPU 11 sets "0" into the bit 0 of the desired register of the selection circuit 14. The selection circuit 14 supplies the enable signal to the keyboard controller 15, and supplies the disable signal to the keyboard controller 16.

The keyboard selection program stored in the ROM 12 is one module of the BIOS. After the computer system is powered on, the CPU 11 executes the keyboard selection program as one of the initialization processes of the computer system and controls the selection circuit 14 in accordance with the keyboard selection program. When the computer system is powered on, the CPU 11 produces a signal used to set a default value into a desired register of the selection circuit 14. During the execution of the keyboard selection program, when the keyboard controller 16 determines that the ACK code is not transferred from the externally provided keyboard 18 during a desired period, the keyboard controller 16 transmits the error code to the CPU 11. The CPU 11 sends a signal used to supply the selection signal to the keyboard controller 15, to the selection circuit 14.

In communication to the keyboard, serial data having an 11 bit frame is used with keyboard data. A synchronized signal is always output from the keyboard to the keyboard controller. When data (command) from the keyboard is received, the keyboard controller sets the received data into an output buffer and executes an interruption to the CPU 11. In this case, the keyboard controller disables an interface to the CPU 11 until the CPU 11 receives the data. If the keyboard controller detects an error during data reception, an error flag is set into a status register of the keyboard controller. Accordingly, the computer system can check the contents of the status register.

An error generated in data reception from the keyboard includes a parity error or a reception timeout error. In both errors, "FFh" is set into the output buffer of the keyboard controller because keyboard data is not received exactly. If a parity error is generated, the keyboard controller retries data transmission to the keyboard.

When data is transmitted from the CPU 11 to the keyboard, the keyboard controller inserts an odd parity bit into command data of an input buffer, converts the command data into serial data, and then transits the serial data to the keyboard. If the keyboard receives the serial data exactly, the keyboard supplies the ACK code to the CPU 11. If the keyboard does not supply the ACK code to the CPU 11, the CPU 11 does not transmit next serial data to the keyboard.

An error generated in data transmission to the keyboard includes a transmission timeout error, a parity error, or a reception timeout error. When an error is generated, "FEh" is set into the output buffer of the keyboard controller, and a desired error flag is set into the status register. Accordingly, when the error is generated, CPU 11 checks whether contents of the output buffer of the keyboard controller is "FFh" or "FEh".

The cause of the error is determined by referring to contents of the status register.

Data transmission from the keyboard controller to the keyboard is executed by firmware of the keyboard controller.

When data transmission from the keyboard controller to the keyboard is performed, the keyboard controller simultaneously sets a KBDAT line and a KBCLK line to a low level during a period of about 100 microseconds. After the KBDAT line is set to a low level, the keyboard waits for data to be transmitted from the keyboard controller. When data having a stop bit is received exactly, the keyboard controller sets the KBDAT line to a low level, and signals the keyboard controller that data reception is completed.

Data transmission from the keyboard to the keyboard controller is executed by firmware of the keyboard.

When the KBCLK line and the KBDAT line are both in a high level, the keyboard transmits data to the keyboard controller. The keyboard monitors the KBCLK line once per one clock time if data transmission is executed. If the keyboard detects that the KBCLK line is set to a low level by the keyboard controller, the keyboard stops data transmission to the keyboard controller.

Although the present invention has been explained in connection with the embodiment of the present invention, it is not restricted to the aforementioned embodiment and can be modified in a variety of ways without departing from the spirit and scope of the present invention.

What is claimed is:

1. A computer system comprising:
   memory means for storing a plurality of program instructions;
   a central processing unit (CPU), coupled to the memory means, for producing system commands to control the computer system in accordance with the instructions;
   a first keyboard for making key codes and commands;
   a second keyboard also for making key codes and commands;
   a first keyboard controller device, coupled to the CPU, for controlling the first keyboard in accordance with the system commands;
   a second keyboard controller device, coupled to the CPU, for controlling the second keyboard in accordance with the system commands, the second keyboard being connectable to and disconnectable from the second keyboard controller device;
   transfer means for communicating system data between the CPU, the memory means, and the first and second keyboard controller devices through a system bus, and for communicating key input data from the first keyboard or the second keyboard to the respective first or second keyboard controller device;
   a selection circuit, coupled to the CPU, for selecting the second keyboard by generating a keyboard selection signal to the second keyboard controller device in accordance with system commands at power-on time of the computer system;
   the keyboards further including means for issuing certain data to the computer system through the transfer means; and
   the CPU further including means, coupled to the memory means for determining that the second keyboard is connected to the second keyboard controller device when the certain data from the second keyboard is received.

2. The computer system according to claim 1, wherein the selection circuit includes means for selecting the first keyboard by generating the keyboard selection signal when the second keyboard is not connected to the second keyboard controller device in accordance with the determining means.

3. A method for selecting one of first keyboard and second keyboards for use with a computer system having a central processing unit (CPU) for producing system commands to control the computer system; a first keyboard controller device, coupled to the CPU, for controlling a first keyboard in accordance with the system commands;

a second keyboard controller device, coupled to the CPU, for controlling a second keyboard in accordance with the system commands, the second keyboard being connectable to and disconnectable from the second keyboard controller device; data transfer means for communicating system data between the CPU, the memory means, and the first and second keyboard controller devices through a system bus, and key input data from the first keyboard or the second keyboard to the respective first or second keyboard controller device; a selection circuit coupled to the CPU for generating a keyboard selection signal to enable either the first keyboard or the second keyboard in accordance with the system commands, the method comprising the steps of:

selecting the second keyboard in accordance with the keyboard selection signal at power-on time of the computer system;

issuing certain data from the second keyboard when the second keyboard controller device is connected thereto to the computer system through the transfer means; and determining whether the second keyboard is connected to the system in accordance with the certain data.

4. The method according to claim 3, wherein said determining step includes the step of determining that the second keyboard is connected to the second keyboard controller device when the keyboard controller means receives the certain data.

5. The method according to claim 4, further comprising the step of:

selecting the first keyboard when the second keyboard controller device does not receive the certain data from the second keyboard.

* * * * *